(12) United States Patent
Byun et al.

(10) Patent No.: US 8,198,822 B2
(45) Date of Patent: Jun. 12, 2012

(54) LIGHT SOURCE DRIVING APPARATUS AND LIGHT SOURCE APPARATUS HAVING THE SAME

(75) Inventors: Sang-Chul Byun, Anyang-si (KR); Gi-Cherl Kim, Yongin-si (KR); Byung-Choon Yang, Seoul (KR); Byoung-Dae Ye, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 434 days.

(21) Appl. No.: 12/496,772

(22) Filed: Jul. 2, 2009

(65) Prior Publication Data

US 2010/0194285 A1 Aug. 5, 2010

(30) Foreign Application Priority Data

Feb. 4, 2009 (KR) .................. 10-2009-0008670

(51) Int. Cl.
*H05B 41/36* (2006.01)
*H05B 43/00* (2006.01)
*H05B 37/02* (2006.01)
(52) U.S. Cl. .................. 315/291; 315/307; 315/129
(58) Field of Classification Search .................. 315/291, 315/125, 307, 129, 294, 209 R; 323/211
See application file for complete search history.

(56) References Cited

U.S. PATENT DOCUMENTS 7,855,520 B2 * 12/2010 Leng .............................. 315/307
2010/0052569 A1 * 3/2010 Hoogzaad et al. ............ 315/294

FOREIGN PATENT DOCUMENTS

| KR | 1020060018042 A | 2/2006 |
| KR | 1020080013152 A | 2/2008 |
| KR | 1020080083935 A | 9/2008 |
| KR | 1020080096279 A | 10/2008 |
| WO | WO 2008068682 A1 * | 6/2008 |

* cited by examiner

*Primary Examiner* — Daniel D Chang
(74) *Attorney, Agent, or Firm* — Cantor Colburn LLP

(57) ABSTRACT

A light source driving apparatus includes; a boosting part which boosts an input voltage received from an input part and generates a driving voltage, a boosting transistor which controls an operation of the boosting part, a rectification part connected between the boosting part and an output part and which transmits the driving voltage to the output part, an integrated circuit which generates a gate signal which controls the boosting transistor, and a protection circuit which generates a protection signal which controls a voltage level of the gate signal according to an output current of the boosting transistor.

20 Claims, 7 Drawing Sheets

LIGHT SOURCE DRIVING APPARATUS AND LIGHT SOURCE APPARATUS HAVING THE SAME

This application claims priority to Korean Patent Application No. 2009-8670, filed on Feb. 4, 2009, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a light source driving apparatus and a display apparatus having the light source driving apparatus. More particularly, exemplary embodiments of the present invention relate to a light source driving apparatus capable of protecting an electronic element and a display apparatus having the light source driving apparatus.

2. Description of the Related Art

Generally, a liquid crystal display ("LCD") apparatus includes an LCD panel which displays an image using the light transmittance modifying capabilities of liquid crystal molecules and a backlight assembly disposed under the LCD panel to provide the LCD panel with light.

The typical LCD panel includes an array substrate, a color filter substrate and a liquid crystal layer disposed therebetween. The array substrate typically includes a plurality of pixel electrodes and a plurality of thin-film transistors ("TFTs") electrically connected to the pixel electrodes respectively. The color filter substrate faces the array substrate, and typically has a common electrode and a plurality of color filters. The liquid crystal layer is interposed between the array substrate and the color filter substrate. When an electric field is generated between the pixel electrode and the common electrode it is applied to the liquid crystal layer and an arrangement direction of the liquid crystal molecules of the liquid crystal layer is controlled to determine the light transmittance of the liquid crystal layer, so that an image is displayed. The LCD panel displays a white image of a high luminance when the light transmittance is increased to maximum, and the LCD panel displays a black image of a low luminance when the light transmittance is decreased to minimum.

The backlight assembly may typically include a lamp or a light-emitting diode ("LED"). When the backlight assembly includes the LED, the backlight assembly typically includes an LED driving circuit for driving the LED. The LED driving circuit typically includes an electronic element such as an integrated circuit ("IC"), an inductor, a diode, a field-effect transistor ("FET"), etc.

BRIEF SUMMARY OF THE INVENTION

Exemplary embodiments of the present invention provide a light source driving apparatus for protecting an electronic element from shorts.

Exemplary embodiments of the present invention also provide a light source apparatus having the light source driving apparatus.

According to one aspect of the present invention, an exemplary embodiment of a light source driving apparatus includes; a boosting part which boosts an input voltage received from an input part and generates a driving voltage, a boosting transistor which controls an operation of the boosting part, a rectification part connected between the boosting part and an output part and which transmits the driving voltage to the output part, an integrated circuit which generates a gate signal which controls the boosting transistor, and a protection circuit which generates a protection signal which controls a voltage level of the gate signal according to an output current of the boosting transistor.

According to one aspect of the present invention, an exemplary embodiment of a light source driving apparatus includes; a boosting part which boosts an input voltage received from an input part and generates a driving voltage, a boosting transistor which controls an operation of the boosting part, a rectification part connected between the boosting part and an output part, and which transmits the driving voltage to the output part, a protection transistor connected between the input part and the boosting part and which switches the input part and the boosting part and a protection circuit which generates a protection signal which controls an operation of the protection transistor according to an output current of the boosting transistor.

According to another aspect of the present invention, an exemplary embodiment of a light source apparatus includes; a light source module including a light source string, the light source string including a plurality of light sources connected in series, and a light source driving part which provides a driving voltage to the light source string, the light source driving part including; a boosting part which boosts an input voltage received from an input part and generates a driving voltage, a boosting transistor which controls an operation of the boosting part, a rectification part connected between the booting part and an output part, and which transmits the driving voltage to the output part, an integrated circuit which generates a gate signal which controls the boosting transistor, and a protection circuit which generates a protection signal which controls a voltage level of the gate signal according to an output current of the boosting transistor.

According to another aspect of the present invention, an exemplary embodiment of a light source apparatus includes; a light source module including a light source string, the light source string including a plurality of light sources connected in series, and a light source driving part which provides a driving voltage to the light source string, the light source driving part including; a boosting part which boosts an input voltage received from an input part to generate a driving voltage, a boosting transistor which controls an operation of the boosting part, a rectification part connected between the boosting part and an output part, and which transmits the driving voltage to the output part, a protection transistor which selectively provides the input voltage to the boosting part and a protection circuit which generates a protection signal which controls an operation of the protection transistor according to an output current of the boosting transistor.

According to the present invention, an exemplary embodiment of a light source driving part includes a boosting part boosting an input voltage and a rectification part transmitting a boosted voltage to an output part. When at least one of the boosting part and the rectification part is shorted, a boosting transistor is forcibly turned off. Thus, the boosting transistor may be prevented from being damaged by an overcurrent that is caused by the shorted boosting part or the shorted rectification part.

BRIEF DESCRIPTION OF THE DRAWINGS

The above and other aspects, features and advantages of the present invention will become more apparent by describing in further detail exemplary embodiments thereof with reference to the accompanying drawings, in which.

DETAILED DESCRIPTION OF THE INVENTION

Figure 1:
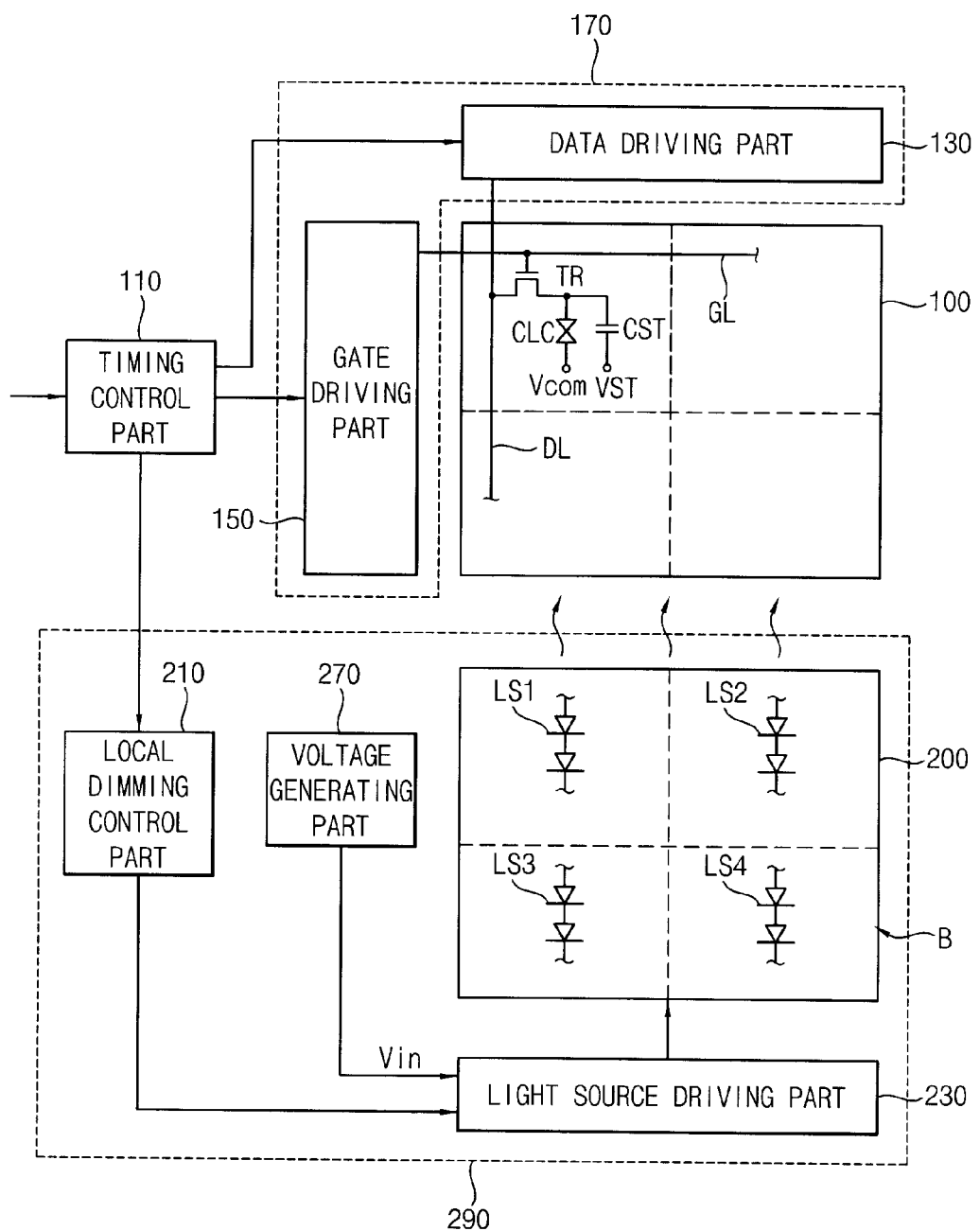
FIG. 1 is a block diagram illustrating an exemplary embodiment of a display apparatus according to the present invention.

The invention now will be described more fully hereinafter with reference to the accompanying drawings, in which exemplary embodiments of the invention are shown. The invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. Like reference numerals refer to like elements throughout.

It will be understood that when an element or layer is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram illustrating an exemplary embodiment of a display apparatus according to the present invention.

Referring to FIG. 1, the display apparatus includes a display panel 100, a timing control part 110, a panel driving part 170 and a light source apparatus 290.

The display panel 100 includes a plurality of pixels for displaying an image. For example, in one exemplary embodiment, the number of the pixels may be M×N (wherein M and N are natural numbers). Each pixel P includes a switching element TR connected to a gate line GL and a data line DL, a liquid crystal capacitor CLC and a storage capacitor CST.

The timing control part 110 receives a control signal and an image signal from an external apparatus. The timing control part 110 generates a timing control signal which controls a driving timing of the display panel 100 using the received control signal. In one exemplary embodiment, the timing control signal includes a clock signal, a horizontal start signal and a vertical start signal.

The panel driving part 170 drives the display panel 100 according to the control of the timing control part 110. The panel driving part 170 includes a data driving part 130 and a gate driving part 150.

The data driving part 130 drives the data line DL using a data control signal and an image signal received from the timing control part 110. The data driving part 130 converts the image signal into an analog data signal to output to the data line DL. The gate driving part 150 drives the gate line GL using a gate control signal received from the timing control part 110. The gate driving part 150 outputs a gate signal to the gate line GL.

The light source apparatus 290 includes a light source module 200, a local dimming control part 210, a light source driving apparatus 230 and a voltage generating part 270. Hereinafter, the light source driving apparatus 230 will be referred to as a light source driving part.

In the present exemplary embodiment, the light source module 200 is divided into a plurality of light-emitting blocks B, each of the light-emitting blocks B including a light source string that has a plurality of light sources in series. For example, in one exemplary embodiment, the light source is a light-emitting diode ("LED") and the light-emitting block B is an LED string that has a plurality of LEDs connected to one another in series. In one exemplary embodiment, the light source module 200 includes a plurality of LED strings LS1, LS2, LS3 and LS4 connected in parallel with each other.

In the present exemplary embodiment, the local dimming control part 210 divides the image signal into a plurality of image blocks D corresponding to the plurality of light-emitting blocks B, and generates a plurality of pulse width modulation ("PWM") signals controlling the luminance of each of the light-emitting blocks B based on the gray scale of each of the image blocks D.

The light source driving part 230 respectively drives the plurality of light-emitting blocks B of the source module 200 using the PWM signals.

The voltage generating part 270 generates an input voltage Vin to provide to the light source driving part 230.

Figure 2:
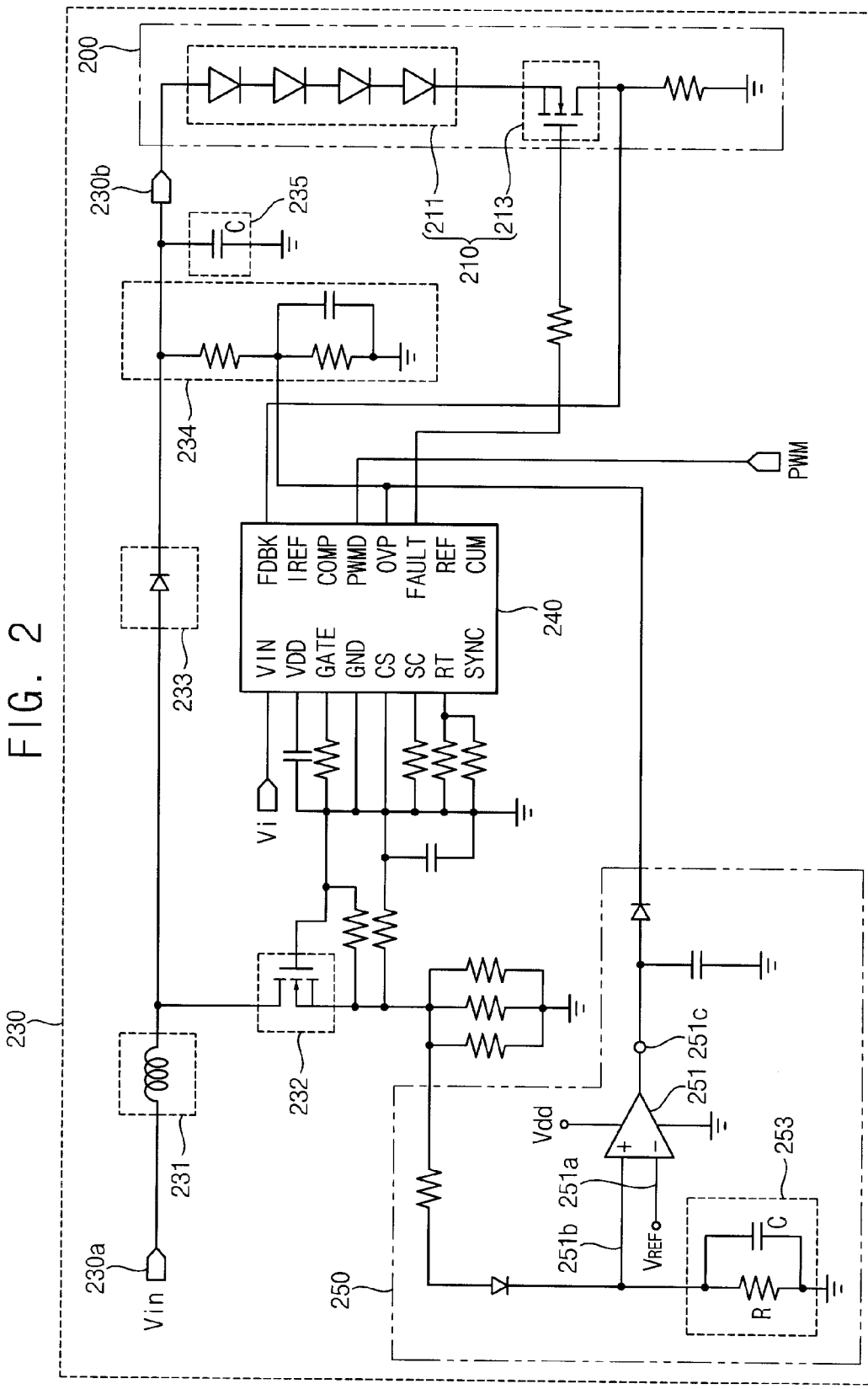
FIG. 2 is an equivalent circuit diagram illustrating an exemplary embodiment of a light source apparatus of FIG. 1.

FIG. 2 is an equivalent circuit diagram illustrating an exemplary embodiment of the light source apparatus of FIG. 1.

Referring to FIGS. 1 and 2, the current exemplary embodiment of a light source apparatus includes the light source module 200 and the light source driving part 230.

The light source module 200 includes an LED string part 210, which may be equivalent to any of the light strings LS1-LS4. The LED string part 210 includes an LED string 211 including a plurality of LEDs connected in series and a switching transistor 213 connected to the LED string 211.

A first end of the LED string 211 is connected to an output part 230b of the light source driving part 230 and second end of the LED string 211 is connected to the switching transistor 213. The switching transistor 213 includes an input electrode connected to the second end of the LED string 211, a control electrode connected to the light source driving part 230 and an output electrode connected to a ground. In one exemplary embodiment, a resistor is disposed between the switching transistor 213 and the ground.

In the present exemplary embodiment, the light source driving part 230 includes a boosting part 231, a boosting transistor 232, a rectification part 233, a voltage feedback part 234, a charging part 235, an integrated circuit 240 and a protection part 250.

In the present exemplary embodiment, the boosting part 231 includes an inductor. The boosting part 231 includes a first end and a second end. The first end of the boosting part 231 is connected to an input part 230a of the light source driving part 230 receiving an input voltage Vin. The second end of the boosting part 231 is connected to the boosting transistor 232.

In the present exemplary embodiment, the boosting transistor 232 includes an input electrode connected to the second end of the boosting part 231, a control electrode connected to a gate terminal GATE of the integrated circuit 240 and an output electrode connected to a sensing terminal CS of the integrated circuit 240.

In the present exemplary embodiment, the rectification part 233 includes a diode. The rectification part 233 includes a first end connected to the second end of the boosting part 231 and a second end connected to the output part 230b of the light source driving part 230. As described above, the output part 230b is connected to the first end of the LED string 211 so that the driving voltage Vout output via the output part 230b is applied to the LED string 211.

In the present exemplary embodiment, the voltage feedback part 234 is connected to the second end of the rectification part 233 and the output part 230b. The voltage feedback part 234 adjusts the driving voltage Vout to the predetermined voltage to provide to the integrated circuit 240.

In the present exemplary embodiment, the charging part 235 is connected between the second end of the rectification part 233 and the output part 230b to charge the driving voltage Vout.

In the present exemplary embodiment, the integrated circuit 240 includes a gate terminal GATE, a sensing terminal CS, a feedback terminal FDBK, a dimming control terminal FAULT, a dimming terminal PWMD, and a protection terminal OVP, among various other terminals, which may optionally be utilized or included in the integrated circuit 240. The integrated circuit 240 performs a boosting mode and a dimming mode. The boosting mode boosts up, e.g., increases, the input voltage Vin to generate the driving voltage Vout and the dimming mode respectively controls the luminance of the LED strings.

The gate terminal GATE is connected to the gate electrode of the boosting transistor 232. The gate terminal GATE outputs the gate signal at a high voltage level for turning on the boosting transistor 232 and the gate signal at a low voltage level for turning off the boosting transistor 232. In one exemplary embodiment, the gate signal at a low voltage level may correspond to a voltage below the threshold voltage of the boosting transistor 232.

The sensing terminal CS is connected to the output electrode of the boosting transistor 232. The integrated circuit 240 adjusts a duty ratio of the gate signal applied to the gate terminal GATE according to an output current of the boosting transistor 232 received at the sensing terminal CS. In one exemplary embodiment, the duty ratio corresponds to a pulse width of the gate signal having the high voltage level.

The feedback terminal FDBK receives a feedback current transmitted from the LED string part 210. The feedback terminal FDBK is connected to the output electrode of the switching transistor 213 and receives the feedback current applied to the LED string 211. The integrated circuit 240 compares the feedback current received from the feedback terminal FDBK with a reference value. When the feedback current is abnormal, e.g., greater or lesser than the reference value, the integrated circuit 240 stops the operation of the LED string 211.

The dimming control terminal FAULT is connected to the control electrode of the switching transistor 213. In one exemplary embodiment, the dimming control terminal FAULT is connected to the switching transistor 213 through a resistor. The switching transistor 213 is turned on and turned off based on a control signal output from the dimming control terminal FAULT. For example, in one exemplary embodiment the dimming control terminal FAULT outputs either one of a first control signal corresponding to the PWM signal and a second control signal corresponding to a malfunction of the LED string part 210 depending upon the feedback current as will be described in more detail below. The switching transistor 213 is repeatedly turned on and turned off according to the first control signal corresponding to the PWM signal. The switching transistor 213 is turned off according to the second control signal.

The dimming terminal PWMD receives the PWM signal, e.g., as input by the local dimming control part 210. The integrated circuit 240 generates the first control signal corresponding to the duty ratio of the PWM signal to output via the dimming control terminal FAULT.

The protection terminal OVP is connected to the voltage feedback part 234 and the protection part 250, and receives a feedback voltage provided from the voltage feedback part 234 and a protection signal provided from the protection part 250. The integrated circuit 240 compares a voltage received at the protection terminal OVP with a reference voltage. When the received voltage is abnormal, e.g., when the received voltage is greater or less than reference voltage, the integrated circuit 240 outputs control signals via the gate terminal GATE and the dimming control terminal FAULT, respectively. For example, in one exemplary embodiment the integrated circuit 240 compares the feedback voltage received from the protection terminal OVP with a reference voltage. When the feedback voltage is abnormal, the integrated circuit 240 outputs the second control signal having the low voltage level via the dimming control terminal FAULT and the gate signal having the low voltage level via the gate terminal GATE. In addition, the integrated circuit 240 compares the protection signal received from the protection terminal OVP with a reference voltage. When the protection signal is abnormal, the integrated circuit 240 outputs the second control signal having the low voltage level via the dimming control terminal FAULT and the gate signal having the low voltage level via the gate terminal GATE.

Therefore, when the voltage received from the protection terminal OVP is abnormal, the integrated circuit 240 stops all operations of the boosting mode and the dimming mode.

In the present exemplary embodiment, the protection part 250 includes a comparator 251 and a filter 253. The comparator 251 includes a first input terminal 251a which receives a reference voltage VREF, a second input terminal 251b connected to the output electrode of the boosting transistor 232 and an output end 251c connected to the protection terminal OVP. In one exemplary embodiment, the second input terminal 251b may be connected to the output electrode of the boosting transistor 232 via at least one resistor and at least one diode. In one exemplary embodiment, the output end 251c of the comparator may be connected to the protection terminal OVP via a diode. The comparator 251 compares a detected voltage corresponding to the output current of the boosting transistor 232 with the reference voltage VREF. When the detected voltage is greater than the reference voltage VREF, the comparator 251 outputs the protection signal having a high voltage level. However, when the detected voltage is less than the reference voltage VREF, the comparator 251 outputs the protection signal having a low voltage level. The protection terminal OVP of the integrated circuit 240 receives the protection signal output from the comparator 251.

In the present exemplary embodiment, the filter 253 is connected between the second input terminal 251b and the ground, includes a resistor R and a capacitor C connected in parallel with the resistor R. The filter 253 determines a frequency of a signal applied to the second input terminal 251b.

Hereinafter, an exemplary embodiment of a method of driving the light source driving part 230 will be explained referring to FIG. 2. The method of driving the light source driving part 230 will be explained, when the light source driving part 230 is in an optimal condition, e.g., there are no shorts.

When the operation of the integrated circuit 240 starts, the integrated circuit 240 outputs the gate signal having the high voltage level via the gate terminal GATE. The boosting transistor 232 having the control electrode connected to the gate terminal GATE is turned on, so that the input voltage Vin received from the input part 230a is charged as electromagnetic energy in the boosting part 231. Then, the integrated circuit 240 outputs the gate signal having the low voltage level via the gate terminal GATE. The boosting transistor 232 is turned off in response to the gate signal having the low voltage level, and the charged electromagnetic energy, corresponding to the input voltage Vin, in the boosting part 231 is boosted up to the diving voltage Vout. The driving voltage Vout is applied to the output part 230b through the rectification part 233.

The protection part 250 receives the output current of the boosting transistor 232 when the boosting transistor 232 is turned on. The comparator 251 receives the detected voltage corresponding to the output current of the boosting transistor 232 via the second input terminal 251b, and receives the reference voltage VREF via the first input terminal 251a. The comparator 251 compares the detected voltage with the reference voltage VREF. The comparator 251 outputs the protection signal having the low voltage level, when the detected voltage is normal. For example, in the exemplary embodiment wherein the detected voltage is less than the reference voltage VREF, the comparator 251 outputs the protection signal having the low voltage level. The protection terminal OVP of the integrated circuit 240 receives the protection signal having the low voltage level. The integrated circuit 240 is normally operated, e.g., it provides a PWM signal to the switching transistor 213, in response to the protection signal having the low voltage level received at the protection terminal OVP.

Figure 3A:
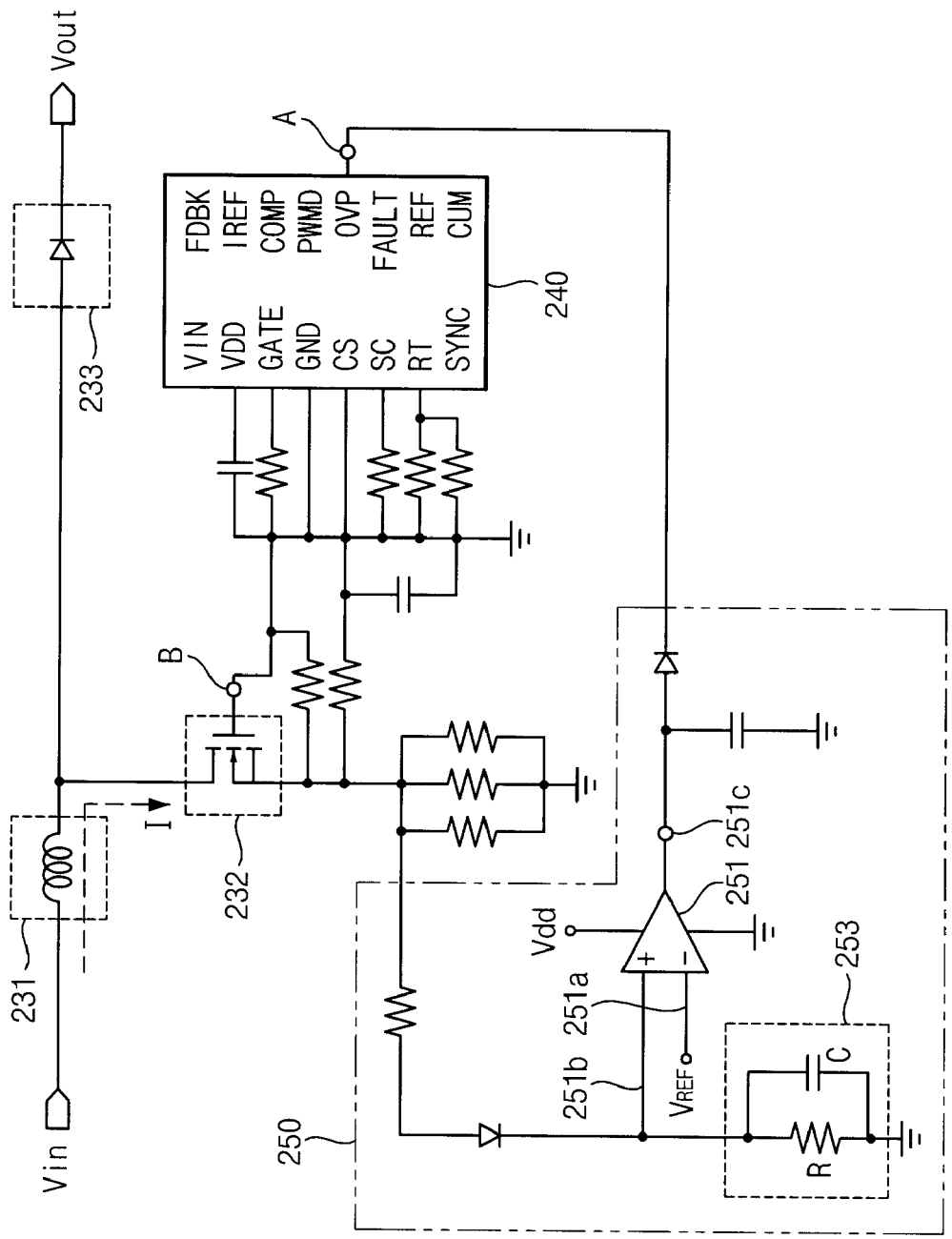
FIG. 3A is an equivalent circuit diagram illustrating an exemplary embodiment of a light source driving part when a boosting part of FIG. 2 is shorted.
Figure 3B:
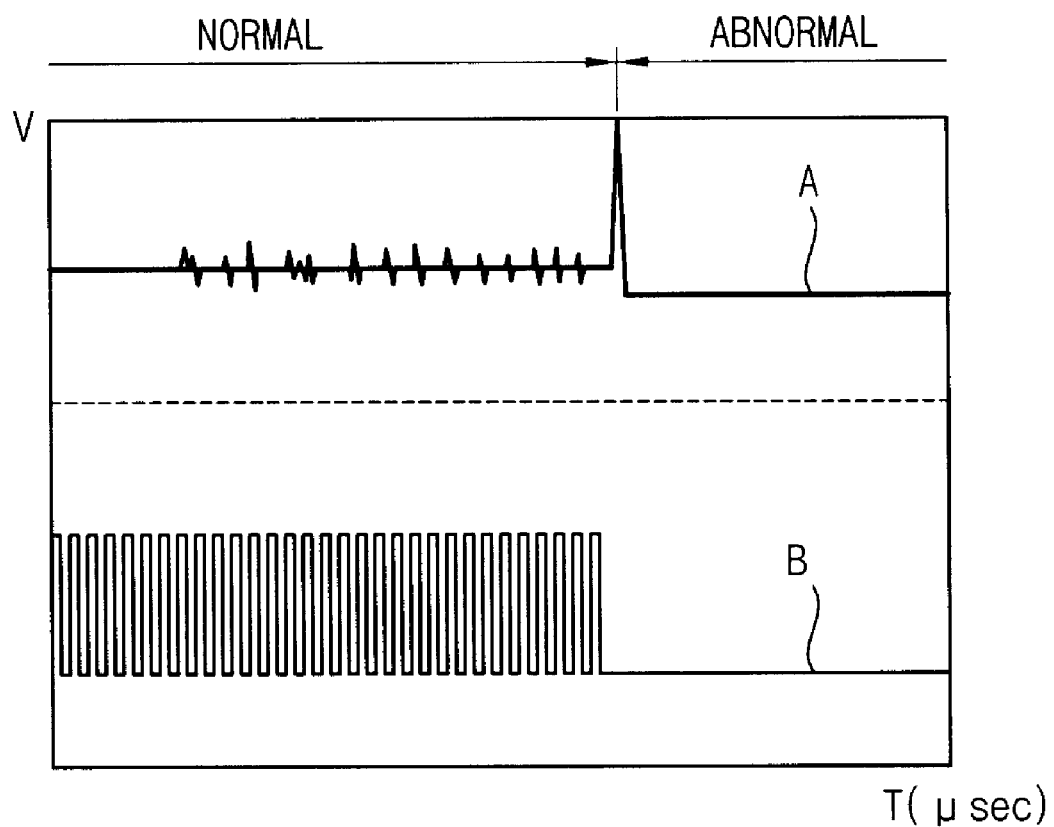
FIG. 3B is a waveform diagram illustrating exemplary embodiments of signals of the light source driving part of FIG. 3A.

FIG. 3A is an equivalent circuit diagram illustrating exemplary embodiment of the light source driving part when the boosting part of FIG. 2 is shorted. FIG. 3B is a waveform diagram illustrating exemplary embodiments of signals of the light driving part of FIG. 3A. Hereinafter, the method of driving the light source driving part 230 will be explained, when the light source driving part 230 is abnormal.

Referring to FIGS. 3A and 3B, when the operation of the integrated circuit 240 starts, the integrated circuit 240 outputs the gate signal having the high voltage level via the gate terminal GATE. The boosting transistor 232 having the control electrode connected to the gate terminal GATE is turned on, so that the input voltage Vin received from the input part 230a is applied to the boosting part 231. When the boosting part 231 is shorted, the input voltage Vin is not charged as electromagnetic energy in the boosting part 231. Therefore, an overcurrent I is caused by the input voltage Vin, the overcurrent I is applied to the input electrode of the boosting transistor 232 through the shorted boosting part 231.

The comparator 251 of the protection part 250 receives the detected voltage corresponding to the overcurrent I. The comparator 251 compares the detected voltage corresponding to the overcurrent I with the reference voltage VREF. The comparator 251 outputs the protection signal having the high voltage level, when the detected voltage is greater than the reference voltage VREF.

Referring to FIG. 3B, when the boosting part 231 is shorted, the protection terminal OVP of the integrated circuit 240 receives the protection signal having the high voltage level. The integrated circuit 240 outputs the gate signal having the low voltage level in response to the protection signal having the high voltage level received at the protection terminal OVP. After the boosting part 231 is shorted, the gate electrode of the boosting transistor 232 receives the gate signal having the low voltage level. That is, the boosting transistor 232 is turned off, when the boosting part 231 is shorted.

Therefore, when the boosting part 231 is shorted, the boosting transistor 232 is turned off so that the overcurrent I is not applied to the boosting transistor 232. Thus, the boosting transistor 232 may be prevented from being damaged by the overcurrent I.

Figure 4A:
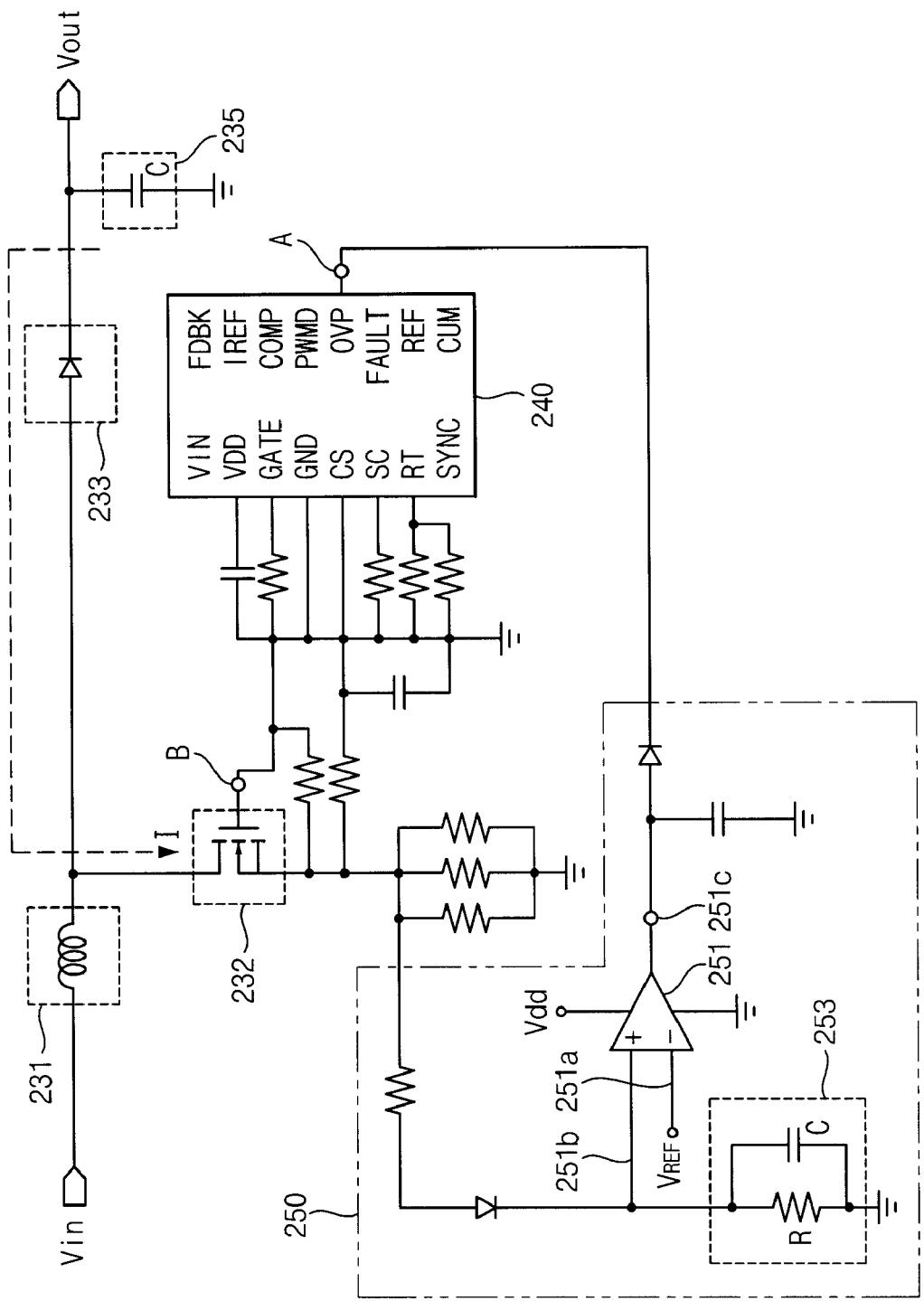
FIG. 4A is an equivalent circuit diagram illustrating an exemplary embodiment of the light source driving part when the rectification part of FIG. 2 is shorted.
Figure 4B:
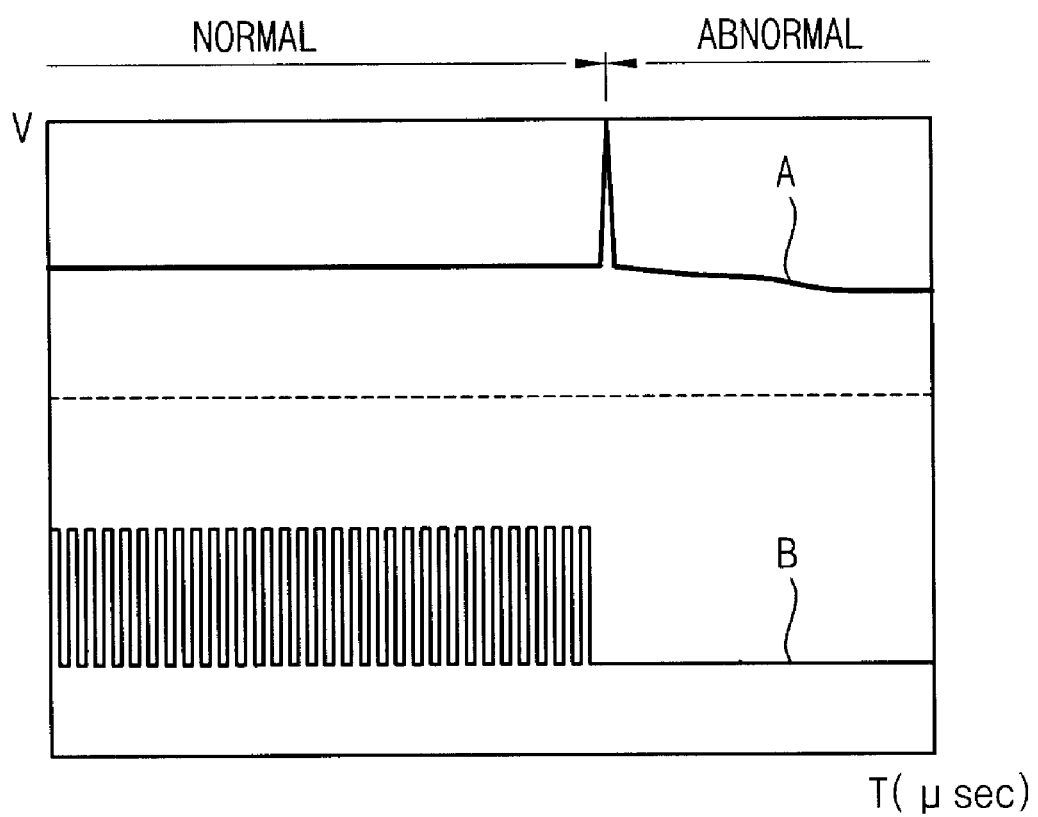
FIG. 4B is a waveform diagram illustrating exemplary embodiments of signals of the light source driving part of FIG. 4A.

FIG. 4A is an equivalent circuit diagram illustrating the light source driving part when the rectification part of FIG. 2 is shorted. FIG. 4B is a waveform diagram illustrating signals of the light source driving part of FIG. 4A.

Referring to FIGS. 4A and 4B, when the operation of the integrated circuit 240 starts, the integrated circuit 240 outputs the gate signal having the high voltage level via the gate terminal GATE. The boosting transistor 232 having the control electrode connected to the gate terminal GATE is turned on, so that the input voltage Vin received from the input part 230a is charged as electromagnetic energy in the boosting part 231.

Then, the integrated circuit 240 outputs the gate signal having the low voltage level via the gate terminal GATE. The boosting transistor 232 is turned off in response to the gate signal having the low voltage level, and the charged energy corresponding to the input voltage Vin is boosted up to the diving voltage Vout. The driving voltage Vout is applied to the output part 230b through the shorted rectification part 233, and is charged in the charging part 235. An overcurrent I is caused by the charged driving voltage Vout in the charging part 235. The overcurrent I flows in a reverse direction due to the shorted rectification part 233 and is applied to the input electrode of the boosting transistor 232.

The comparator 251 of the protection part 250 receives the detected voltage corresponding to the overcurrent I. The comparator 251 compares the detected voltage corresponding to the overcurrent I with the reference voltage VREF. The comparator 251 outputs the protection signal having the high voltage level, when the detected voltage is greater than the reference voltage VREF.

Referring to FIG. 4B, when the rectification part 232 is shorted, the protection terminal OVP of the integrated circuit 240 receives the protection signal having the high voltage level. The integrated circuit 240 outputs the gate signal having the low voltage level in response to the protection signal having the high voltage level received from the protection terminal OVP. After the rectification part 232 is shorted, the gate electrode of the boosting transistor 232 receives the gate signal having the low voltage level. That is, the boosting transistor 232 is turned off, when the rectification part 232 is shorted.

Therefore, when the rectification part 232 is shorted, the boosting transistor 232 is turned off so that the overcurrent I is not applied to the boosting transistor 232. Thus, the boosting transistor 232 may be prevented from being damaged by the overcurrent I.

Hereinafter, another exemplary embodiment of a light source apparatus will be described using the same reference numerals to refer to the same or like parts as those described in the previous exemplary embodiment of FIG. 1, and any further repetitive explanation concerning the above elements will be omitted.

Figure 5:
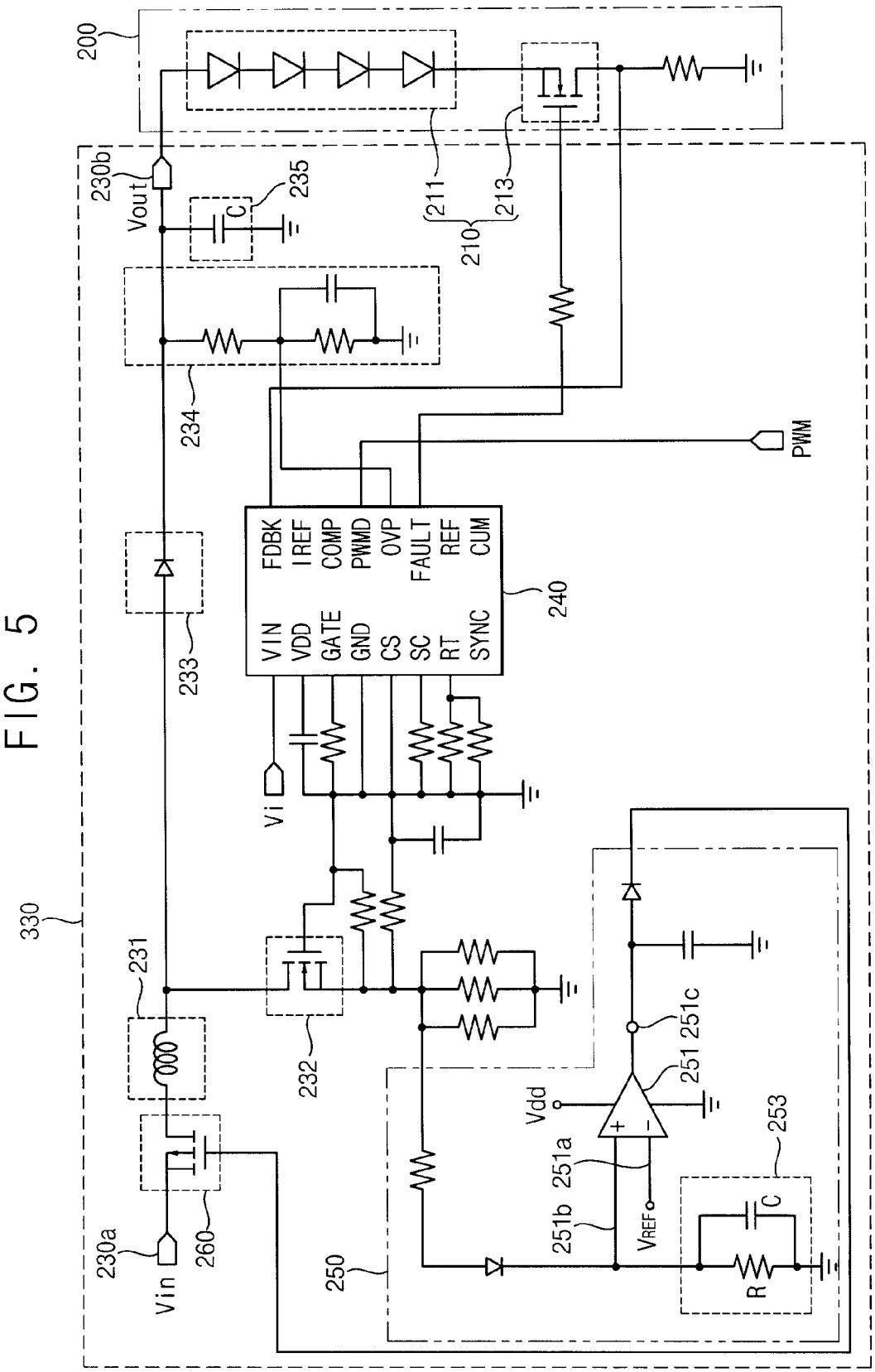
FIG. 5 is an equivalent circuit diagram illustrating another exemplary embodiment of a light source apparatus according to the present invention.

FIG. 5 is an equivalent circuit diagram illustrating another exemplary embodiment of the light source apparatus according to the present invention.

Referring to FIGS. 1 and 5, the current exemplary embodiment of a light source apparatus includes a light source module 200 and a light source driving part 330.

The light source driving part 330 includes a boosting part 231, a boosting transistor 232, a rectification part 233, a voltage feedback part 234, a charging part 235, an integrated circuit 240, a protection part 250 and a protection transistor 260.

In the present exemplary embodiment, the protection transistor 260 is connected between the input part 230a receiving the input voltage Vin and the boosting part 231. The protection transistor 260 includes an input electrode connected to the input part 230a, a control electrode connected to an output terminal 251c, that is an output terminal of the protection part 250, and an output electrode connected to the first end of the boosting part 231. For example, in one exemplary embodiment the protection transistor 260 is turned on in response to a control signal having the high voltage level and turned off in response to the control signal having a low voltage level. That is, in the present exemplary embodiment the protection transistor 260 is a p-channel MOSFET.

When the light source driving part 330 is normal, e.g., when the light source driving part 330 is in an optimal condition, a method of driving the light source driving part 330 is substantially the same as the method of driving the exemplary embodiment of a light source driving part 230 described referring to FIG. 2 in the previous exemplary embodiment, so that any further repetitive explanation concerning the above elements will be omitted.

Hereinafter, the method of driving the light source driving part 330 will be explained referring to FIGS. 3A and 4A, when the light source driving part 330 is abnormal, e.g., when there is a short.

The method of driving the light source driving part 330 will be explained, when the boosting part 231 is shorted. Referring to FIGS. 3A and 5, when the boosting part 231 is shorted, the input voltage Vin is not charged as electromagnetic energy in the boosting part 231. An overcurrent I is caused by the input voltage Vin, the overcurrent I is applied to the input electrode of the boosting transistor 232 through the shorted boosting part 231. The comparator 251 of the protection part 250 receives the detected voltage corresponding to the overcurrent I. The comparator 251 compares the detected voltage corresponding to the overcurrent I with the reference voltage VREF. The comparator 251 outputs the protection signal having the high voltage level, when the detected voltage is greater than the reference voltage VREF.

The control electrode of the protection transistor 260 receives the protection signal having the high voltage level, and the protection transistor 260 is turned off in response to the protection signal having the high voltage level. Therefore, the protection transistor 260 blocks the input voltage Vin received from the input part 230a from being applied to the boosting part 231. As a result, the operation of the light source driving part 330 is stopped so that the boosting transistor 232 may be prevented from being damaged by the overcurrent I.

Hereinafter, the method of driving the light source driving part 330 will be explained, when the rectification part 233 is shorted. Referring to FIGS. 4A and 5, when the operation of the integrated circuit 240 starts, the boosting transistor 232 is turned on so that the input voltage Vin is charged as electromagnetic energy in the boosting part 231. Then, when the boosting transistor 232 is turned off, the charged energy is boosted up to the diving voltage Vout. The driving voltage Vout is applied to the output part 230b through the shorted rectification part 233, and is charged in the charging part 235. An overcurrent I is caused by the charged driving voltage Vout in the charging part 235. The overcurrent I flows in a reverse direction due to the shorted rectification part 233, and is applied to the input electrode of the boosting transistor 232. The comparator 251 compares the detected voltage corresponding to the overcurrent I with the reference voltage VREF. The comparator 251 outputs the protection signal having the high voltage level when the detected voltage is greater than the reference voltage VREF.

The control electrode of the protection transistor 260 receives the protection signal having the high voltage level, and the protection transistor 260 is turned off in response to the protection signal having the high voltage level. Therefore, the protection transistor 260 blocks the input voltage Vin received from the input part 230a applied to the boosting part 231. As a result, the operation of the light source driving part 330 is stopped so that the boosting transistor 232 may be prevented from being damaged by the overcurrent I.

In the present exemplary embodiment, the protection transistor 260 is connected between the input part 230a of the light source driving part 330 and the boosting part 231 however the protection transistor 260 may be connected between the voltage generating part 270 as shown in FIG. 1 and the input part 230a of the light source driving part 330. When at least one of the boosting part 231 and the rectification part 233 is shorted, the protection transistor 260 is turned off. Therefore, the protection transistor 260 may block the input voltage Vin applied to the input part 230a.

According to the present invention, a light source driving part includes a boosting part boosting up an input voltage and a rectification part transmitting the boosted voltage to an output part. When at least one of the boosting part and the rectification part is shorted, a boosting transistor is forcibly turned off. Thus, the boosting transistor may be prevented from being damaged by an overcurrent that is caused by the shorted boosting part or the shorted rectification part.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A light source driving apparatus for driving at least one light source, the light source driving apparatus comprising:
    a boosting part which boosts an input voltage received from an input part and generates a driving voltage;
    a boosting transistor which controls an operation of the boosting part;
    a rectification part connected between the boosting part and an output part and which transmits the driving voltage to the output part;
    an integrated circuit which generates a first gate signal which controls the boosting transistor and a second gate signal which controls a switching transistor connected with the at least one light source;
    a protection circuit which generates a protection signal which controls a voltage level of the first gate signal according to an output current of the boosting transistor and controls a voltage level of the second gate signal according to at least one of the protection signal and a voltage at a node between the rectification part and the output part.

2. The light source driving apparatus of claim 1, wherein the protection circuit generates the protection signal at a high voltage level when a detected voltage corresponding to the output current of the boosting transistor is greater than a reference voltage, and the integrated circuit generates the first and the second gate signals at a low voltage level corresponding to a turn-off voltage of the boosting transistor and a turn-off voltage of the switching transistor in response to the high voltage level of the protection signal.

3. The light source driving apparatus of claim 2, wherein the protection circuit generates the protection signal at a low voltage level when the detected voltage is one of less than and equal to the reference voltage, and the integrated circuit provides the first and the second gate signals having a predetermined duty ratio to the boosting transistor and the switching transistor in response to the protection signal at the low voltage level.

4. The light source driving apparatus of claim 1, further comprising:
    a charging part connected in parallel with the rectification part, wherein the boosting transistor and the switching transistor are turned off when at least one of the boosting part and the rectification part is shorted.

5. A light source driving apparatus comprising:
    a boosting part which boosts an input voltage received from an input part and generates a driving voltage;
    a boosting transistor which controls an operation of the boosting part;
    a rectification part connected between the boosting part and an output part, and which transmits the driving voltage to the output part;
    a protection transistor connected between the input part and the boosting part, and which switches the input part and the boosting part; and
    a protection circuit which generates a protection signal which controls an operation of the protection transistor according to an output current of the boosting transistor.

6. The light source driving apparatus of claim 5, wherein the protection circuit generates the protection signal at a high voltage level when a detected voltage corresponding to the output current of the boosting transistor is greater than a reference voltage, and the protection transistor is turned off in response to the protection signal at the high voltage level.

7. The light source driving apparatus of claim 6, wherein the protection circuit generates the protection signal at a low voltage level when the detected voltage is one of less than the reference voltage, and the protection transistor is turned on in response to the protection signal at the low voltage level.

8. The light source driving apparatus of claim 5, further comprising a charging part connected in parallel with the rectification part, wherein a gap between the input part and the boosting part is electrically opened when at least one of the boosting part and the rectification part is shorted.

9. A light source apparatus comprising:
a light source module including:
   a light source string, the light source string including a plurality of light sources connected in series; and
   a switching transistor which controls an operation of the light source string; and
a light source driving part which provides a driving voltage to the light source string, the light source driving part including:
   a boosting part which boosts an input voltage received from an input part and generates a driving voltage;
   a boosting transistor which controls an operation of the boosting part;
   a rectification part connected between the boosting part and an output part, and which transmits the driving voltage to the output part;
   an integrated circuit which generates a first gate signal which controls the boosting transistor and a second gate signal which controls the switching transistor; and
   a protection circuit which generates a protection signal which controls a voltage level of the first gate signal according to an output current of the boosting transistor and controls a voltage level of the second gate signal according to at least one of the protection signal and a voltage at a node between the rectification part and the output part.

10. The light source apparatus of claim 9, wherein the protection circuit generates the protection signal at a high voltage level when a detected voltage corresponding to the output current of the boosting transistor is greater than a reference voltage, and the integrated circuit generates the first and the second gate signals at a low voltage level corresponding to a turn-off voltage of the boosting transistor and a turn-off voltage of the switching transistor in response to the protection signal at the high voltage level.

11. The light source apparatus of claim 10, wherein the protection circuit generates the protection signal at a low voltage level when the detected voltage is one of less and equal to than the reference voltage, and the integrated circuit provides the first and the second gate signals having a predetermined duty ratio to the boosting transistor and the switching transistor in response to the protection signal at the low voltage level.

12. The light source apparatus of claim 10, further comprising a charging part connected in parallel with the rectification part, wherein the boosting transistor and the switching transistor are turned off when at least one of the boosting part and the rectification part is shorted.

13. The light source apparatus of claim 9, wherein light source module includes a plurality of light source strings, and the integrated circuit individually controls the luminance of each of the plurality of light source strings.

14. A light source apparatus comprising:
a light source module including a light source string, the light source string including a plurality of light sources connected in series; and
a light source driving part which provides a driving voltage to the light source string, the light source driving part including:
   a boosting part which boosts an input voltage received from an input part to generate a driving voltage;
   a boosting transistor which controls an operation of the boosting part;
   a rectification part connected between the boosting part and an output part, and which transmits the driving voltage to the output part;
   a protection transistor which selectively provides the input voltage to the boosting part; and
   a protection circuit which generates a protection signal which controls an operation of the protection transistor according to an output current of the boosting transistor.

15. The light source apparatus of claim 14, wherein the protection transistor is connected between the input part and the boosting part, and switches between the input part and the boosting part according to the protection signal.

16. The light source apparatus of claim 14, further comprising a voltage generating part which generates the input voltage, wherein the protection transistor is connected between the voltage generating part and the input part and switches between the voltage generating part and the input part according to the protection signal.

17. The light source apparatus of claim 14, wherein the protection circuit generates the protection signal at a high voltage level when a detected voltage corresponding to the output current of the boosting transistor is greater than a reference voltage, and the protection transistor is turned off in response to the protection signal at the high voltage level.

18. The light source apparatus of claim 14, further comprising a charging part connected in parallel with the rectification part, wherein the protection transistor is turned off when at least one of the boosting part and rectification part is shorted.

19. The light source apparatus of claim 14, wherein the light source driving part includes an integrated circuit which generates a gate signal which controls the boosting transistor.

20. The light source apparatus of claim 19, wherein light source module includes a plurality of light source strings and the integrated circuit individually controls the luminance of each of the plurality of light source strings.

* * * * *